(12) United States Patent
Ohkubo et al.

(10) Patent No.: US 10,534,199 B2
(45) Date of Patent: Jan. 14, 2020

(54) FUNCTIONAL SHEET AND LENS USING SAME

(71) Applicants: MITSUBISHI GAS CHEMICAL COMPANY, INC., Tokyo (JP); MGC FILSHEET CO., LTD., Saitama (JP)

(72) Inventors: Akio Ohkubo, Tokyo (JP); Hideaki Kimura, Tokyo (JP); Masukazu Hirata, Tokyo (JP); Masaki Yagoura, Tokyo (JP)

(73) Assignees: MITSUBISHI GAS CHEMICAL COMPANY, INC., Tokyo (JP); MGC FILSHEET CO., LTD., Saitama (JP)

( * ) Notice: Subject to any disclaimer, the term of this patent is extended or adjusted under 35 U.S.C. 154(b) by 977 days.

(21) Appl. No.: 14/626,541

(22) Filed: Feb. 19, 2015

(65) Prior Publication Data
US 2015/0160479 A1 Jun. 11, 2015

Related U.S. Application Data

(62) Division of application No. 13/502,415, filed as application No. PCT/JP2010/068444 on Oct. 20, 2010, now abandoned.

(30) Foreign Application Priority Data

Oct. 21, 2009 (JP) .................................. 2009-242090
Oct. 21, 2009 (JP) .................................. 2009-242091

(51) Int. Cl.
*B29D 11/00* (2006.01)
*G02C 7/10* (2006.01)
(Continued)

(52) U.S. Cl.
CPC ............ *G02C 7/12* (2013.01); *B29D 11/0073* (2013.01); *G02B 1/04* (2013.01); *G02B 1/14* (2015.01);
(Continued)

(58) Field of Classification Search
CPC ... B29D 11/00634; G02F 2001/133631; G02F 2001/133638; B32B 38/0012; B29C 48/16; G02C 7/102; G02C 7/12
(Continued)

(56) References Cited

U.S. PATENT DOCUMENTS 3,711,417 A * 1/1973 Schuler ................. G02B 5/3033
 252/585
3,786,119 A * 1/1974 Ortlieb ............. B29D 11/00413
 264/1.32
(Continued)

FOREIGN PATENT DOCUMENTS

EP 299509 6/1994
JP 61-032004 2/1986
(Continued)

OTHER PUBLICATIONS

U.S. Appl. No. 13/514,620 to Jiro Abe et al., filed Jun. 8, 2012.
(Continued)

*Primary Examiner* — Matthew J Daniels
*Assistant Examiner* — Andrew D Graham
(74) *Attorney, Agent, or Firm* — Greenblum & Bernstein, P.L.C.

(57) ABSTRACT

According to the present invention, a functional sheet, comprising a polarizing or photochromic functional layer and protective layers provided on both surfaces of the functional layer can be provided. The protective layers include an aromatic polycarbonate resin sheet or film. At least one of the protective layers is a co-extruded sheet or film including an aromatic polycarbonate resin layer and an acrylic-based resin layer provided on one surface or both surfaces of the aromatic polycarbonate resin layer. At least one surface of the functional sheet is of the acrylic-based
(Continued)

resin layer. Also according to the present invention, a lens using such a functional sheet can be provided.

10 Claims, 5 Drawing Sheets

(51) Int. Cl.
  *G02C 7/12* (2006.01)
  *G02B 5/23* (2006.01)
  *G02B 1/04* (2006.01)
  *G02B 5/30* (2006.01)
  *G02B 1/14* (2015.01)

(52) U.S. Cl.
  CPC .............. *G02B 5/23* (2013.01); *G02B 5/305* (2013.01); *G02B 5/3033* (2013.01); *G02B 5/3083* (2013.01); *G02C 7/102* (2013.01); *G02C 7/108* (2013.01); *G02C 2202/16* (2013.01); *Y10T 428/24983* (2015.01); *Y10T 428/31507* (2015.04)

(58) Field of Classification Search
  USPC ............................................. 264/1.31, 1.32
  See application file for complete search history.

(56) References Cited

U.S. PATENT DOCUMENTS

| | | | | |
|---|---|---|---|---|
| 3,884,606 A * | 5/1975 | Schrenk | ............. | B29C 47/0021 264/173.12 |
| 4,317,860 A * | 3/1982 | Strassel | .................. | B32B 27/08 428/421 |
| 4,364,886 A * | 12/1982 | Strassel | .................. | B32B 27/08 264/239 |
| 4,423,185 A * | 12/1983 | Matsumoto | ............. | B32B 27/06 525/66 |
| 4,576,766 A * | 3/1986 | Baskerville | ............... | C08F 2/44 264/1.1 |
| 4,661,186 A * | 4/1987 | De Bernardi | ......... | B29C 65/028 156/230 |
| 4,908,272 A * | 3/1990 | Harada | .................. | B32B 27/34 428/412 |
| 5,015,523 A * | 5/1991 | Kawashima | ..... | B29D 11/00009 427/162 |
| 5,049,427 A * | 9/1991 | Starzewski | .............. | G02B 1/08 359/487.06 |
| 5,094,788 A * | 3/1992 | Schrenk | ................ | B01F 5/0644 264/173.15 |
| 5,106,693 A * | 4/1992 | Harada | .................. | B32B 27/34 428/412 |
| 5,126,880 A * | 6/1992 | Wheatley | .................. | B32B 7/02 359/587 |
| 5,232,637 A * | 8/1993 | Dasher | ................ | B29C 33/0038 156/212 |
| 5,355,183 A * | 10/1994 | Andrea | ..................... | G02C 7/12 351/135 |
| 5,434,707 A * | 7/1995 | Dalzell | .............. | B29D 11/0073 264/1.32 |
| 5,496,295 A * | 3/1996 | Wilfong | .................. | B29C 48/18 604/332 |
| 5,702,813 A * | 12/1997 | Murata | .................... | B32B 27/36 428/332 |
| 5,751,481 A * | 5/1998 | Dalzell | ................. | B29C 51/428 264/1.32 |
| 5,757,459 A * | 5/1998 | Bhalakia | ........... | B29C 45/14811 351/159.48 |
| 5,805,336 A * | 9/1998 | Dalzell | .................. | B29D 11/0073 264/1.32 |
| 5,817,402 A * | 10/1998 | Miyake | ................... | B08B 17/06 428/159 |
| 5,851,328 A * | 12/1998 | Kohan | ................ | B29D 11/0073 156/102 |
| 5,867,316 A * | 2/1999 | Carlson | ................ | G02B 5/3008 359/487.02 |
| 6,025,897 A * | 2/2000 | Weber | ..................... | A47J 36/28 349/62 |
| 6,057,961 A * | 5/2000 | Allen | .................... | G02B 5/3008 359/489.12 |
| 6,060,003 A * | 5/2000 | Karszes | ................. | B29C 43/222 264/1.34 |
| 6,074,579 A * | 6/2000 | Greshes | .................. | B29C 43/52 264/1.32 |
| 6,096,375 A * | 8/2000 | Ouderkirk | ............ | B29C 55/023 359/487.02 |
| 6,096,425 A * | 8/2000 | Smith | ................ | B29D 11/0073 428/412 |
| 6,106,924 A * | 8/2000 | Yamazaki | ............ | B29C 55/023 428/136 |
| 6,179,948 B1 * | 1/2001 | Merrill | .................. | B29C 55/023 156/160 |
| 6,180,033 B1 * | 1/2001 | Greshes | ................ | B29C 43/203 264/1.32 |
| 6,190,738 B1 | 2/2001 | Beck | | |
| 6,242,081 B1 * | 6/2001 | Endo | ................. | B32B 17/10018 428/212 |
| 6,254,712 B1 * | 7/2001 | Enlow | .................. | B05D 1/265 156/244.11 |
| 6,256,146 B1 * | 7/2001 | Merrill | .................. | G02B 5/3008 252/585 |
| 6,319,433 B1 * | 11/2001 | Kohan | ............... | B29D 11/0073 156/275.5 |
| 6,322,860 B1 * | 11/2001 | Stein | ........................ | B32B 3/02 349/158 |
| 6,336,988 B1 * | 1/2002 | Enlow | .................... | B05D 1/286 156/238 |
| 6,364,988 B1 * | 4/2002 | Lin | ....................... | B29C 55/023 156/244.17 |
| 6,426,861 B1 * | 7/2002 | Munshi | ................... | B32B 27/00 29/25.42 |
| 6,440,553 B2 * | 8/2002 | Tokunaga | .............. | C09J 169/00 428/355 AC |
| 6,486,262 B1 * | 11/2002 | Suzuki | ...................... | C08F 8/04 264/1.32 |
| 6,575,726 B1 * | 6/2003 | Nissel | ..................... | B29C 48/92 425/327 |
| 6,620,509 B1 * | 9/2003 | Yamamoto | ............ | B32B 27/30 359/273 |
| 6,673,425 B1 * | 1/2004 | Hebrink | .................. | B32B 27/36 156/244.11 |
| 7,036,932 B2 * | 5/2006 | Boulineau | ......... | B29C 45/14811 351/159.62 |
| 7,118,806 B2 * | 10/2006 | Nishizawa | .......... | B29D 11/0073 428/412 |
| 7,318,960 B2 * | 1/2008 | Yamamoto | .......... | B29D 11/0073 427/163.1 |
| 7,524,910 B2 * | 4/2009 | Jiang | ..................... | C08F 10/00 526/348 |
| 7,597,441 B1 * | 10/2009 | Farwig | ................... | G02B 5/208 351/159.65 |
| 7,662,318 B2 * | 2/2010 | Jiang | .................. | B29D 11/0073 264/1.31 |
| 7,695,653 B2 * | 4/2010 | Hsu | .................... | B29D 11/0073 264/1.32 |
| 7,781,068 B2 * | 8/2010 | Nakamura | ............. | G02B 1/105 428/481 |
| 7,942,523 B2 * | 5/2011 | Su | ....................... | B29D 11/0073 264/1.1 |
| 8,703,296 B2 * | 4/2014 | Fujinaka | ............. | B29D 11/0073 428/474.7 |
| 2001/0008700 A1 * | 7/2001 | Jonza | ..................... | B32B 27/36 428/480 |
| 2001/0011779 A1 * | 8/2001 | Stover | ................ | B29C 47/0021 264/1.7 |
| 2001/0028435 A1 * | 10/2001 | Evans | ................... | B29C 33/0061 351/159.56 |
| 2001/0028436 A1 * | 10/2001 | Evans | ..................... | B29C 51/10 351/159.56 |

(56) References Cited

U.S. PATENT DOCUMENTS

| | | | |
|---|---|---|---|
| 2001/0035935 A1* | 11/2001 | Bhalakia | B29D 11/00028 351/159.62 |
| 2002/0005925 A1* | 1/2002 | Arakawa | G02B 5/3083 349/117 |
| 2002/0006505 A1* | 1/2002 | Nishizawa | B32B 27/08 428/220 |
| 2002/0015836 A1* | 2/2002 | Jonza | B32B 27/08 428/216 |
| 2002/0018177 A1* | 2/2002 | Dillon | G02C 7/00 351/159.62 |
| 2002/0018897 A1* | 2/2002 | Kuckertz | C23C 4/12 428/409 |
| 2002/0036359 A1* | 3/2002 | Yamamoto | B29C 45/14 264/1.34 |
| 2002/0080488 A1* | 6/2002 | Nakagoshi | B29C 45/14 359/485.01 |
| 2002/0135728 A1* | 9/2002 | Tatsuta | G02F 1/133305 349/158 |
| 2002/0197484 A1* | 12/2002 | Nishizawa | B32B 7/04 428/423.1 |
| 2003/0035972 A1* | 2/2003 | Hanson | B32B 7/02 428/480 |
| 2003/0075264 A1* | 4/2003 | Terakado | B29C 48/9155 156/244.24 |
| 2003/0148095 A1* | 8/2003 | Kollaja | B32B 3/18 428/343 |
| 2003/0184863 A1* | 10/2003 | Nakagoshi | B29C 45/14 351/159.27 |
| 2003/0214080 A1* | 11/2003 | Maki | B29C 45/14811 351/159.74 |
| 2004/0105072 A1* | 6/2004 | Qin | B29C 45/14811 351/159.27 |
| 2004/0209057 A1* | 10/2004 | Enlow | B05D 1/265 428/220 |
| 2005/0064160 A1* | 3/2005 | Watson | B32B 3/00 428/212 |
| 2005/0158555 A1* | 7/2005 | Anders | B32B 27/365 428/412 |
| 2005/0168690 A1* | 8/2005 | Kawai | B29C 39/025 351/159.6 |
| 2005/0243274 A1* | 11/2005 | Chou | B29D 11/0073 351/159.56 |
| 2005/0287357 A1* | 12/2005 | Wang | B32B 7/02 428/323 |
| 2006/0062935 A1* | 3/2006 | Murakami | C08J 5/18 428/1.31 |
| 2006/0144514 A1* | 7/2006 | Wang | B29D 11/0073 156/324 |
| 2006/0145374 A1* | 7/2006 | Baba | B29C 43/222 264/1.34 |
| 2006/0225831 A1* | 10/2006 | Lei | B32B 37/226 156/229 |
| 2006/0233984 A1* | 10/2006 | Suzuki | B29C 61/0608 428/34.9 |
| 2006/0272766 A1* | 12/2006 | Hebrink | B32B 27/08 156/244.11 |
| 2007/0014020 A1* | 1/2007 | Bourdelais | G02B 6/0053 359/619 |
| 2007/0060704 A1* | 3/2007 | Rudiger | B29C 48/07 525/67 |
| 2007/0177272 A1* | 8/2007 | Benson | B32B 27/28 359/584 |
| 2007/0182898 A1* | 8/2007 | Yamaoka | B29D 11/0073 349/117 |
| 2007/0211334 A1* | 9/2007 | Tsujiuchi | B32B 7/12 359/487.06 |
| 2008/0004404 A1* | 1/2008 | van de Grampel | C08L 69/00 525/439 |
| 2008/0007828 A1* | 1/2008 | Tsujiuchi | B32B 7/12 359/487.02 |
| 2008/0057227 A1* | 3/2008 | Suzuki | C08B 3/06 428/1.1 |
| 2008/0083998 A1* | 4/2008 | Merrill | B29C 55/065 264/1.34 |
| 2008/0094707 A1* | 4/2008 | Tsukane | B32B 27/34 359/507 |
| 2008/0112047 A1* | 5/2008 | Mizushima | B29D 11/00634 359/487.05 |
| 2008/0193701 A1* | 8/2008 | Takayanagi | G02B 5/305 428/64.4 |
| 2008/0213606 A1* | 9/2008 | Saegusa | C08F 8/04 428/500 |
| 2008/0252972 A1* | 10/2008 | Chida | B32B 27/08 359/485.01 |
| 2008/0280113 A1* | 11/2008 | Iwatani | B29C 55/023 428/206 |
| 2008/0316404 A1* | 12/2008 | Yamaki | G02F 1/133502 349/118 |
| 2009/0030171 A1* | 1/2009 | Leenders | C08L 69/00 528/196 |
| 2009/0136733 A1* | 5/2009 | Maekawa | B32B 27/08 428/220 |
| 2009/0180059 A1* | 7/2009 | Fukuda | B32B 23/08 349/96 |
| 2009/0186168 A1* | 7/2009 | Nitta | C08J 5/18 428/1.1 |
| 2009/0194901 A1* | 8/2009 | Nakamura | B29C 41/26 264/171.25 |
| 2010/0014144 A1* | 1/2010 | Ota | G02B 1/041 359/241 |
| 2010/0015400 A1* | 1/2010 | Tokuchi | B32B 27/30 428/172 |
| 2010/0047484 A1* | 2/2010 | Kitagishi | G02B 1/105 428/1.31 |
| 2010/0078849 A1* | 4/2010 | Noritsune | B29C 43/222 264/175 |
| 2010/0078850 A1* | 4/2010 | Noritsune | B29C 43/22 264/175 |
| 2010/0103352 A1* | 4/2010 | Suzuki | B29C 48/9155 349/96 |
| 2010/0134879 A1* | 6/2010 | Yoshihara | B32B 27/30 359/361 |
| 2011/0026240 A1* | 2/2011 | Hayashi | G02B 6/0065 362/97.1 |
| 2011/0218303 A1* | 9/2011 | Oshima | C08J 5/18 525/94 |
| 2011/0269910 A1* | 11/2011 | Chun | B29C 48/0018 525/205 |
| 2012/0206689 A1* | 8/2012 | Ohkubo | G02B 1/04 351/44 |
| 2012/0245317 A1 | 9/2012 | Abe et al. | |
| 2013/0010253 A1* | 1/2013 | Tokumaru | B29C 45/14811 351/49 |

FOREIGN PATENT DOCUMENTS

| | | |
|---|---|---|
| JP | 03-096901 | 4/1991 |
| JP | 2002-062423 | 2/2002 |
| JP | 2003-062952 | 3/2003 |
| JP | 2005-225018 | 8/2005 |
| JP | 2005-280154 | 10/2005 |
| JP | 2005-305306 | 11/2005 |
| JP | 2006-215465 | 8/2006 |
| JP | 2007-219110 | 8/2007 |
| JP | 2007-256544 | 10/2007 |
| KR | 10-2009-0080970 | 7/2009 |
| WO | 01/77723 | 10/2001 |

OTHER PUBLICATIONS

Search report from International Patent Application No. PCT/JP2010/068444, dated Jan. 18, 2011.

Buning et al., "Optical Anisotropy of Polycarbonates"; Springer Netherlands; 1998; pp. 405-409. Abstract submitted.

(56) References Cited

OTHER PUBLICATIONS

Extended European Search Report issued in Patent Application No. 10824957.4, dated May 4, 2017.

* cited by examiner

[Fig.1]
a
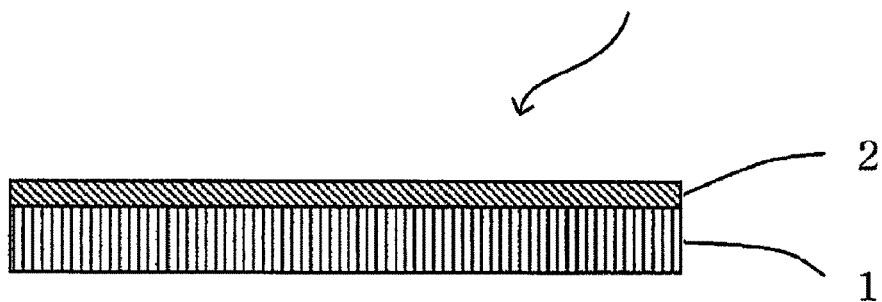
b
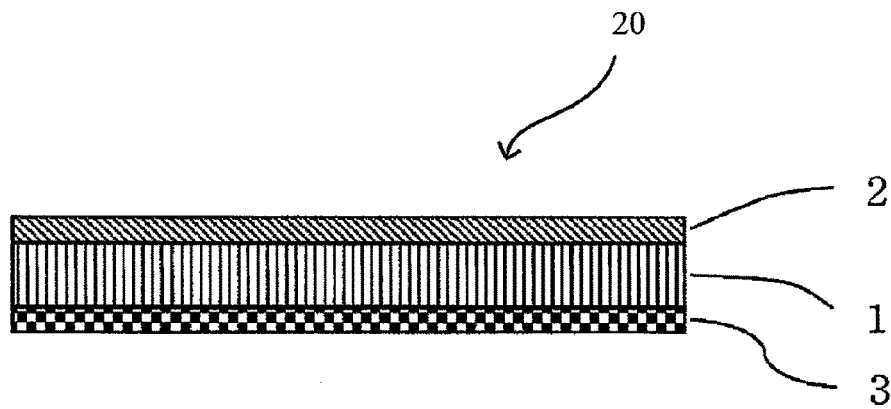
c
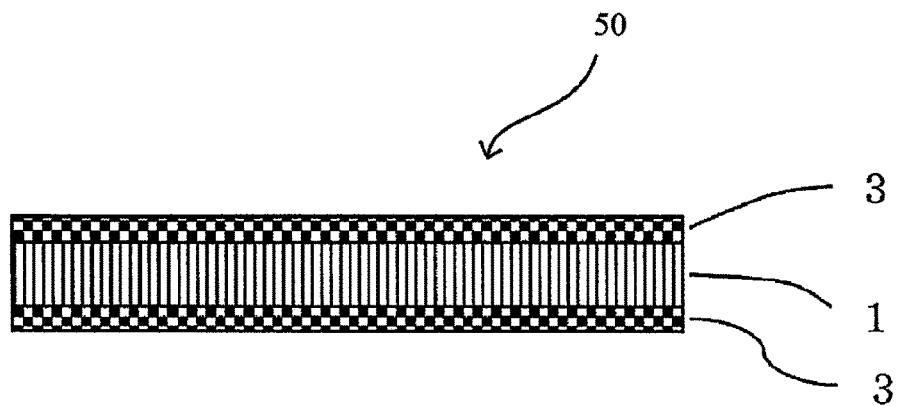
d
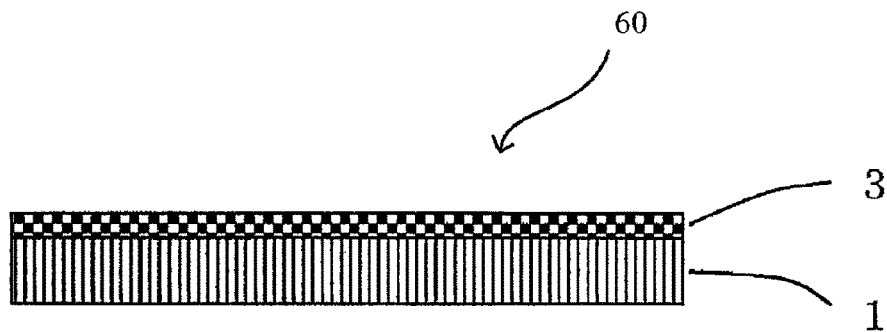

[Fig.2]
a
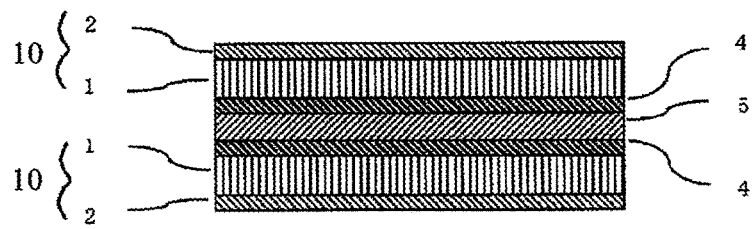
b
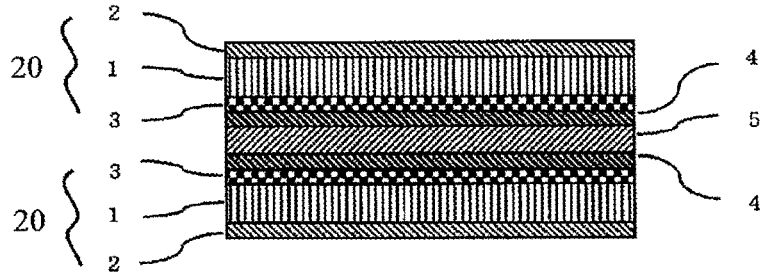
c
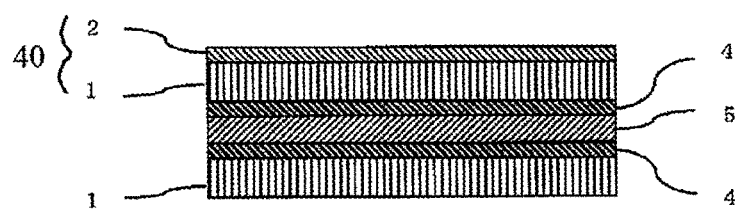
d
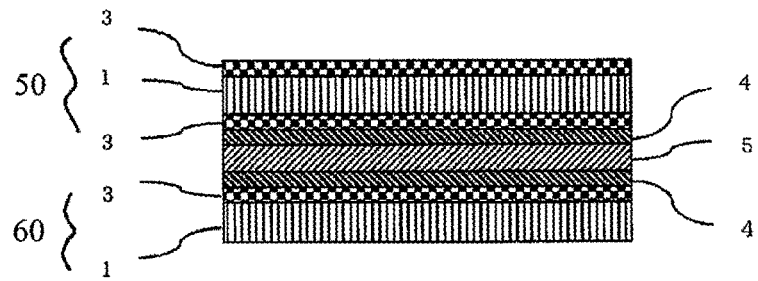
e
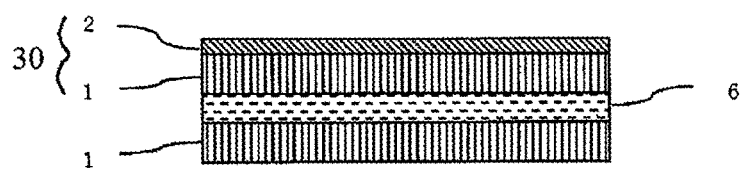

[Fig.3]
a
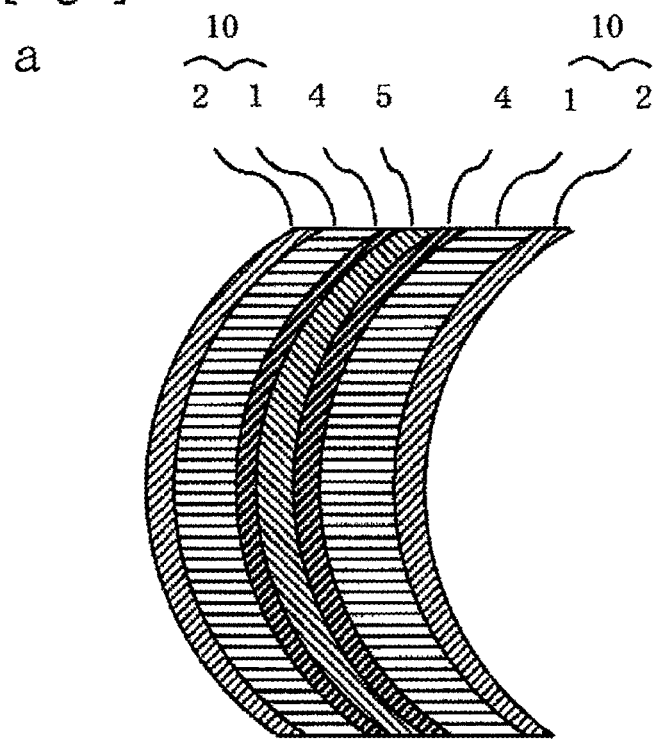
b
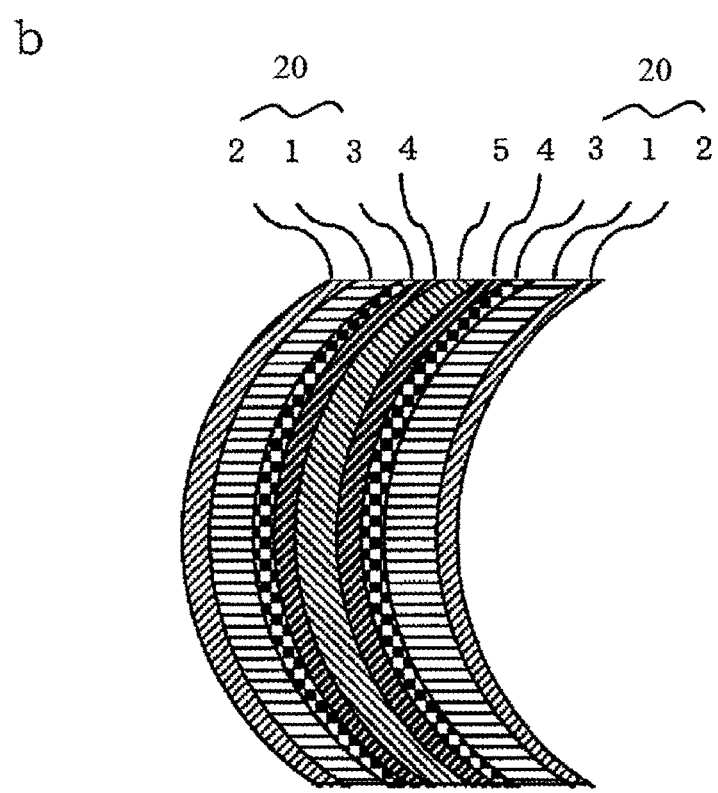

[Fig.4]
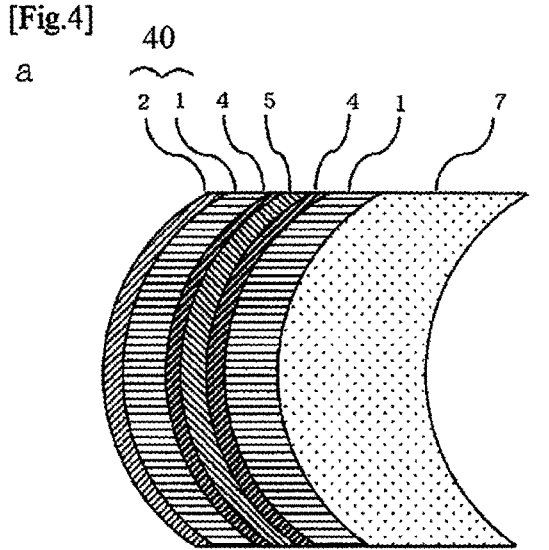
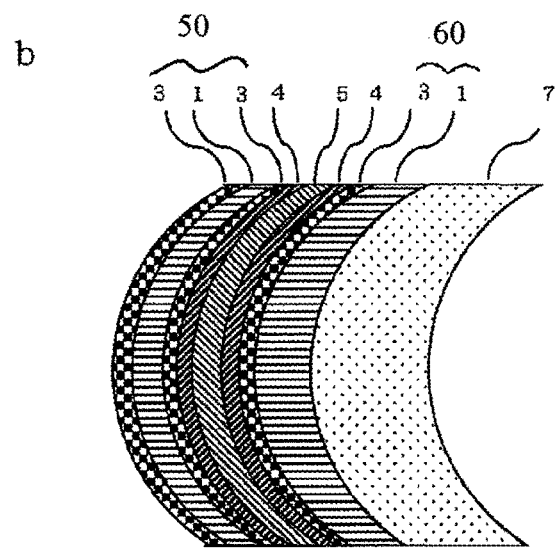
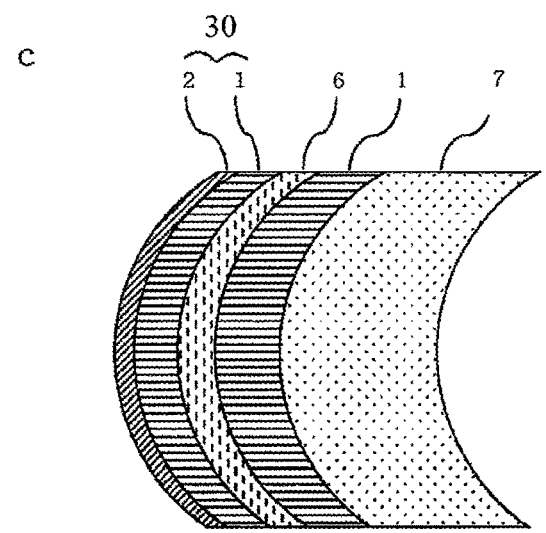

[Fig.5]
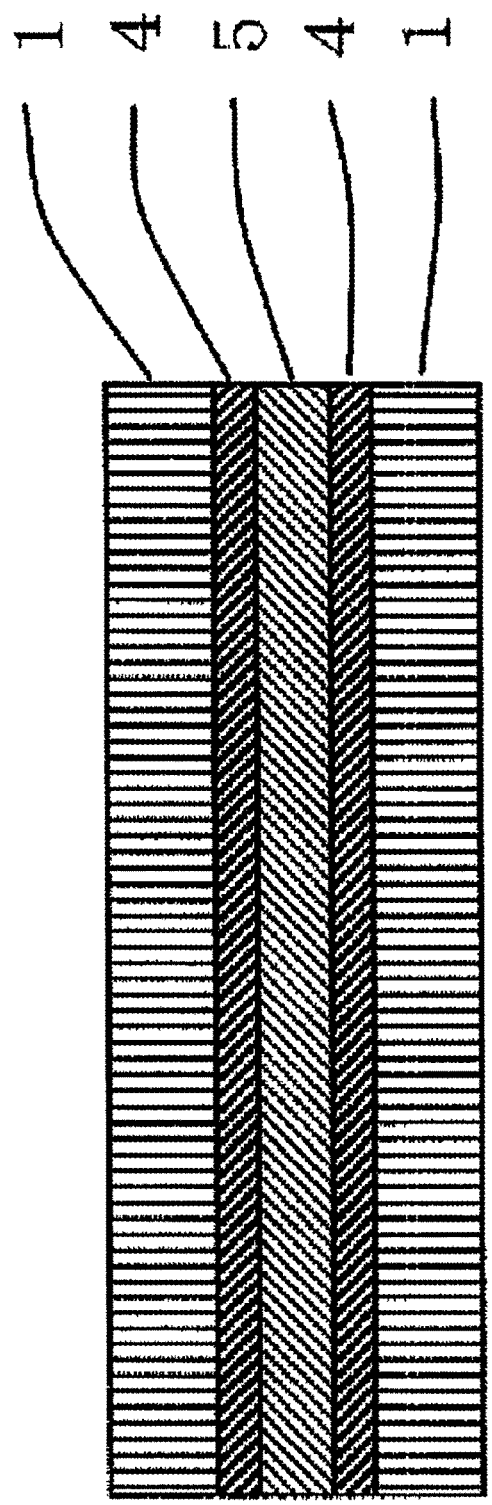
Conventional Art

FUNCTIONAL SHEET AND LENS USING SAME

CROSS-REFERENCE TO RELATED APPLICATIONS

This application is a Divisional of U.S. patent application Ser. No. 13/502,415 which is a National Stage of International Application No. PCT/JP2010/068444 filed Oct. 20, 2010, which claims priority to Japanese Application No. 2009-242090, and Japanese Application Nos. 2009-242091 both filed Oct. 21, 2009. The disclosures of U.S. patent application Ser. No. 13/502,415 and PCT/JP2010/068444 are expressly incorporated by reference herein in their entireties.

TECHNICAL FIELD

The present invention relates to a functional sheet having polarization properties or photochromic properties preferably usable for sunglasses, goggles, corrective lenses and the like, and a lens using such a functional sheet.

BACKGROUND ART

Optical items such as sunglasses, goggles, and corrective lenses and the like with polarizers are preferably used for the purpose of alleviating the glare provided by light reflected by a water surface, a snow surface, a road surface or the like and making outdoor scenes easier to see. When natural light is incident on, and reflected by, a water surface or the like, there is a polarization component which is monotonously increased with respect to the angle of reflection. The above-mentioned optical items utilize a phenomenon that when a polarizer is used such that an absorption axis thereof is horizontal, such a polarization component can be cut. Light can be described and behave by two straight polarizations perpendicular to each other. Therefore, where a vibration component of light which is in a plane including the incident light and the normal direction thereto is p polarization, and a component vibrating in a plane perpendicular to the above-mentioned plane is s polarization, the p polarization of light reflected by a water surface or the like has a minimum point which becomes almost zero at an angle of reflection of 55° or in the vicinity thereof, whereas the s polarization of such light monotonously increases. This s polarization is cut.

There are also transparent optical items such as sunglasses, goggles, corrective lenses and the like including a layer containing a photochromic colorant and thus having photochromic performance of being colored under external light containing a large amount of ultraviolet rays and of being colorless under artificial light containing a small amount of ultraviolet rays.

A known polarizer usable for these items is formed of a resin film, typically, a poly(vinyl alcohol) (PVA) film. Such a film is stretched in one direction while being dyed with iodine or a dichroic dye and thus is provided with polarization properties.

Known methods for providing such a film with photochromic performance include (1) a method of using a polymer solution containing a photochromic colorant to form a casting film; (2) a method of melt-extruding a thermoplastic polymer containing a photochromic colorant to form a film; (3) a method of preparing and using a composition for forming a film, the composition containing a photochromic colorant; (4) a method of preparing and using an adhesive composition containing a photochromic colorant; (5) a method of thermally diffusing a photochromic colorant in a film or a substrate to form a photochromic diffusion layer; and the like (e.g., Patent Document 1).

One method for applying any of the functional layers described above to optical items such as sunglasses, goggles, corrective lenses and the like uses a functional sheet including protective layers on both surfaces of a layer having polarization properties, a layer having photochromic properties, or a layer having both of these properties.

An example of a transparent plastic material usable for the protective layer is a thermoplastic resin. Examples of the thermoplastic resin include aromatic polycarbonate, polymethylmethacrylate, transparent nylon, acetyl cellulose and the like.

Among these materials, aromatic polycarbonate is used from the viewpoint of impact resistance. Polymethylmethacrylate, transparent nylon, hydrocarbon-based resins having an alicyclic substance as a main chain, acetyl cellulose and the like are used from the viewpoints of crack resistance, fashionability, and various other requirements.

A functional layer and a protective layer are integrated together usually by use of a curable resin adhesive, but troubles sometimes occur due to adhesion failure between the functional layer and the protective layer.

Especially when aromatic polycarbonate is used for the protective layer, such an adhesion failure is often observed as delamination of the aromatic polycarbonate protective layer from the adhesive layer.

Aromatic polycarbonate has a problem of causing solvent cracks. Therefore, depending on the solvent used, an adhesive layer cannot be formed on the layer of aromatic polycarbonate, and moreover, the remaining solvent causes cracks. However, if excessive drying is performed for the purpose of removing the solvent, the adhesive strength is usually weakened. There are also limitations on forming an adhesive layer on both adherend surfaces of aromatic polycarbonate for the purpose of realizing strong adhesion.

In order to alleviate this problem, it is easily conceivable to form a protective layer against the adhesive agent on an adhesive surface of aromatic polycarbonate. In the case where the functional sheet includes a protective layer formed of aromatic polycarbonate, plasma treatment is performed as a preparatory treatment for usual adhesion.

However, there is no document found yet which directly refers to forming a protective layer against the adhesive agent.

For other purposes, for example, for producing a thermosetting lens using a functional sheet, there are methods by which a film resistant against a curable resin monomer solution is formed on a surface of a functional sheet, for example, a film of a curable acrylic-based resin or the like is formed on a surface of a functional sheet (Patent Documents 2 and 3).

An optical item such as sunglasses, goggles, corrective lenses or the like using the above-mentioned functional sheet is usually produced as follows. First, the functional sheet is molded to be a lens which is curved as desired. Alternatively, the functional sheet is molded to be a bent item having a curved surface, then the bent item is attached to a mold, and a rear surface thereof is provided with a transparent plastic material by means of injection molding, thereby forming a lens. The lens obtained by either method is subjected to hard-coating, reflection prevention, and any other surface treatment when desired. Then, the steps of shaping the lens to fit into the frame (external shape processing), drilling holes, and tightening with screws, and the like are conducted. In this manner, the optical item is assembled.

While being handled as described above, the layer of the transparent plastic material is exposed to stresses caused by abrasion, bending, compression, tension, twisting, non-uniform deformation due to temperature or humidity change, and the like. Among these, abrasion on the surface layer of the transparent plastic material is a problem. When the material is not highly resistant against abrasion, a product having scratches is liable to be provided, which lowers the production yield.

Among the above-described functional sheets, a functional sheet including an aromatic polycarbonate layer, which is highly impact resistant, is easily scratched. Therefore, such a functional sheet is, for example, hard-coated after being produced (Patent Document 4).

Patent Document 5 describes that a protective layer formed of a (meth)acrylic-based resin may have an insufficient mechanical strength or the like, and thus a polycarbonate-based resin layer is provided on an outer surface of a (meth)acrylic-based resin forming a protective layer so that the polycarbonate-based resin layer acts as an outer surface of the functional sheet.

CITATION LIST

Patent Literature

Patent Document 1: Japanese Laid-Open Patent Publication No. H03-96901
Patent Document 2: Japanese Laid-Open Patent Publication No. 2005-280154
Patent Document 3: Japanese Laid-Open Patent Publication No. 2005-305306
Patent Document 4: Japanese Laid-Open Patent Publication No. S61-032004
Patent Document 5: Japanese Laid-Open Patent Publication No. 2006-215465

SUMMARY OF INVENTION

Technical Problem

Even a method by which the functional sheet, after being produced, is hard-coated is not considered to sufficiently prevent the above-described problem, and scratches are generated at a certain probability. In the case where post-treatment is necessary, materials usable for the treatment need to be used. There are products provided with no surface treatment such as hard-coating. In such a case, products which are less liable to be scratched are more preferable. The inter-layer adhesive strength is considered to be improved by adding a step specifically provided for this purpose, but needless to say, it is more preferable that the products are produced without such a step.

The present invention, made in light of such a situation, has an object of providing a functional sheet including a polarizing or photochromic functional layer, having an improved adhesiveness between the functional layer and a protective layer, and also having an improved resistance of the protective layer against abrasion; and a lens using such a functional sheet.

Solution to Problem

Namely, the present invention is directed to the following.

(1) A functional sheet, comprising a polarizing or photochromic functional layer and protective layers provided on both surfaces of the functional layer, the protective layer including an aromatic polycarbonate resin sheet or film; wherein at least one of the protective layers is a co-extruded sheet or film including an aromatic polycarbonate resin layer and an acrylic-based resin layer provided on one surface or both surfaces of the aromatic polycarbonate resin layer, and at least one surface of the functional sheet is of the acrylic-based resin layer.

(2) The functional sheet according to (1) above, wherein the polarizing functional layer is produced by dyeing a poly(vinyl alcohol)-based resin film with a dichroic organic dye and stretching the poly(vinyl alcohol)-based resin film.

(3) The functional sheet according to (1) above, wherein the photochromic functional layer is produced by a casting method by use of a non-aromatic-based polymer solution containing a photochromic organic compound.

(4) The functional sheet according to (1) above, wherein the photochromic functional layer is produced by heating and thus curing a two-liquid thermosetting urethane resin containing a polyurethane prepolymer which contains a photochromic organic compound and a curing agent.

(5) The functional sheet according to (4) above, wherein the photochromic functional layer is a layer adhering to the co-extruded sheet or film as the protective layer or adhering to the polarizing functional layer.

(6) The functional sheet according to (1) above, wherein the acrylic-based resin layer of the co-extruded sheet or film is a hard acrylic-based resin layer which exhibits a pencil hardness of 2H or higher at a thickness of 60 µm, or a soft acrylic-based resin layer containing, as a copolymerization component, 5 mol % or higher of alkyl(meth)acrylate having an alkyl group with a carbon number of 2 or greater.

(7) The functional sheet according to (1) above, wherein the co-extruded sheet or film has a retardation of 3000 nm or greater.

(8) A lens obtained by a process by which the functional sheet according to (1) above which includes the acrylic-based resin layer at both surfaces thereof is subjected to external shape processing and subjected to bending processing while being heated and pressurized.

(9) A molded lens obtained by a process by which the functional sheet according to (1) above, which includes the acrylic-based resin layer at one surface and the aromatic polycarbonate resin layer at the other surface, is subjected to external shape processing such that the acrylic-based resin layer is on a convexed surface side, and is subjected to bending processing while being heated and pressurized; then the resultant sheet is attached to a mold such that the convexed surface side is in contact with the mold; and an aromatic polycarbonate resin is provided on a concaved surface side of the sheet by injection molding.

(10) Sunglasses or goggles using the lens according to (8) or (9) above.

Advantageous Effects of Invention

Sunglasses, goggles and the like using a functional sheet according to the present invention are improved in the production yield, and also are less liable to be scratched in use.

BRIEF DESCRIPTION OF DRAWINGS

FIG. 1 provides schematic cross-sectional views each showing a co-extruded sheet usable as a protective layer according to the present invention.

FIG. 2 provides schematic cross-sectional views each showing a functional sheet according to the present invention.

FIG. 3 provides schematic cross-sectional views each showing a bent lens using a functional sheet according to the present invention.

FIG. 4 provides schematic cross-sectional views each showing a molded lens using a functional sheet according to the present invention.

FIG. 5 is a schematic cross-sectional view showing a functional sheet in the conventional art.

DESCRIPTION OF EMBODIMENTS

Hereinafter, a functional sheet according to the present invention will be described.

The functional sheet according to the present invention includes (a) a polarizing or photochromic functional layer; (b) protective layers at least one of which is a co-extruded sheet or film of an aromatic polycarbonate layer and an acrylic-based resin layer; and optionally (c) an adhesive layer for bonding the functional layer a and the protective layers b or bonding the functional layers a.

The present invention is also directed to a lens produced by performing bending processing on such a functional sheet; and a molded lens produced by performing bending processing on such a functional sheet, attaching the resultant functional sheet to a mold, and providing the functional sheet with a transparent thermoplastic resin by means of injection molding.

[Polarizing Functional Layer]

A polarizing functional layer according to the present invention is usually produced by use of a poly(vinyl alcohol)-based resin film which is dyed with a dichroic organic dye and stretched.

Examples of the poly(vinyl alcohol) include poly(vinyl alcohol) (PVA); poly(vinyl formal) which has trace amounts of acetic acid ester structure of PVA, is a PVA derivative or is a PVA analog; poly(vinyl acetal), saponified ethylene-vinyl acetate copolymer and the like. PVA is especially preferable. This film is stretched in one direction while being immersed in, or caused to adsorb, a dichroic organic dye, optionally immobilized, and dried. Thus, a polarizing film is obtained.

The weight average molecular weight of the PVA film is 50,000 to 350,000, preferably 150,000 to 300,000. The PVA film before being dyed/stretched usually has a thickness of about 100 to 300 µm. The PVA film obtained as a result of stretching and dyeing usually has a thickness of 10 to 50 µm.

The stretching magnification of the PVA film is 2 to 8 times, and is selected in accordance with the purpose. From the viewpoint of the post-stretching strength, a preferable stretching magnification is 3 to 5 times.

[Photochromic Functional Layer]

A photochromic functional layer according to the present invention is usable as (1) a photochromic film produced in advance or (2) a photochromic adhesive layer containing a photochromic organic compound.

The (1) photochromic film includes a non-aromatic resin film and a photochromic organic compound uniformly dispersed therein, and can be produced by a known method such as a casting method, a melt extrusion method, a thermal diffusion method or the like. Resins usable for a substrate include cellulose-based resins such as acetyl cellulose and the like, saponified ethylene-vinyl acetate copolymer, and the like. In the case where the substrate film is required to have thermal resistance, for example, in the case where the photochromic film is produced by a thermal diffusion method, a film of a curable substance such as polyurethane, diallylcarbonate or the like is usable.

In the case of (2) above, usually, any of substances usable for an adhesive layer described later is selected. Among such substances, a substance which has a high photochromic response speed, is less deteriorated after long-time use, allows a desirable photochromic organic compound to be uniformly mixed therewith in an amount as large as possible, and is effective as an adhesive layer is selected.

According to the present invention, a two-liquid thermosetting urethane resin containing a polyurethane prepolymer and a curing agent therefor is preferable.

Usable photochromic compounds include, for example, known spiropyran-based, spirooxazine-based, and naphthopyran-based compounds. These compounds are used independently or in a combination of two or more.

[Protective Layer]

According to the present invention, as at least one of the protective layers, a co-extruded sheet or film including an aromatic polycarbonate resin layer and an acrylic-based resin layer is used. The sheet or film including an aromatic polycarbonate resin layer and an acrylic-based resin layer may be produced by any of known methods such as an extrusion lamination method, a method of fusing the films or sheets by use of heat or ultrasonic waves, a coating method and the like, instead of the co-extrusion method. Each method has advantages and disadvantages.

In the case of the extrusion lamination method, it specifically requires a high level of skill to produce a thin acrylic-based resin which has a high surface hardness but is stable. The adhesive strength between the films obtained by the extrusion lamination method tends to be poor like the adhesive strength between films or sheets fused by use of heat or ultrasonic waves.

In the case of the coating method, when there is a solvent, a resin having a large molecular weight which cannot be extruded or the like is usable as a solution. A curable resin is also generally usable. As can be seen, the coating method is a splendid method usable in a very wide variety of applications. However, an aromatic polycarbonate resin is poor in the resistance against solvent cracks. Therefore, when an aromatic polycarbonate resin is used, it is indispensable to precisely control the solvent to use, the components of the curable monomer and the amount ratio thereof, the method of use and the like. There is another problem that an aromatic polycarbonate resin film or sheet having a high retardation value is inferior in the resistance against solvent cracks to an aromatic polycarbonate resin film or sheet having a low retardation value, and therefore requires more precise control.

According to the present invention, a co-extruded sheet or film which has no problem of the crack resistance and is obtained by mixing fused resins in an extrusion die is used. Mixing fused resins in an extrusion die is preferable in terms of the inter-layer adhesive strength and the structure of the adhesion interface.

The co-extruded sheet or film according to the present invention is of two layers or three layers. The acrylic-based resin layer is selected as follows. In the case of the two-layer film, an acrylic-based resin which mainly fulfills the purpose of improving either the surface hardness or the chemical resistance is usually selected. In the case of the three-layer film, an acrylic-based resin which fulfills the purpose of improving both of the surface hardness and the chemical resistance is selected in addition to the above-selected acrylic-based resin.

Regarding specific uses, for a bent lens usable for sunglasses or goggles, a sheet or film including an acrylic-based resin having a high surface hardness at one surface is usually selected. For the surface in contact with the functional layer (i.e., for the inner surface), a layer which is soft and chemical-resistant is optionally selected, so that this surface can be used as a surface having an improved resistance against organic solvents. Such a surface can improve the adhesive strength at the interface and thus suppresses generation of a problem of delamination or the like.

In the case where the lens is subjected to bending processing, then attached to a mold and subjected to injection molding so as to form a molded lens, the scratches or the like on the surface in contact with the injection-molded resin (usually, the concaved surface) are usually erased by the melt resin. Usually, it is preferable that aromatic polycarbonate is used for the surface layer from the viewpoint of adhesiveness with aromatic polycarbonate used for injection molding. The opposite surface of the functional sheet (usually, the convexed surface) is subjected to surface treatment, such as hard-coating, formation of a reflection-preventive film or the like at the same time as the surface of the injection-molded aromatic polycarbonate resin of the molded lens (usually, the concaved surface). Therefore, it is preferable that the conditions for these steps are the same as much as possible for the surface of the injection-molded resin and the opposite surface. From this viewpoint, it is preferable that the opposite surface has substantially the same properties as those of the surface adhering to the functional layer (inner surface). Since the opposite surface is pressed to the mold by the pressure of the resin during the injection molding and is also surface-treated, minute scratches or the like on the opposite surface are erased. For the surface adhering to the functional layer (inner surface), a layer for improving the adhesive strength and suppressing the generation of a problem such as delamination or the like is preferably usable, like for the bent lens.

The protective layer has a thickness of 50 µm to 2 mm, preferably 100 µm or 1 mm.

In the case of the co-extruded sheet or film, the thickness of the acrylic-based resin layer is less than 50% of the total thickness, and is 10 µm or greater. Usually, the thickness of the acrylic-based resin layer is selected from 10 µm to 500 µm, preferably from 20 to 100 µm.

The retardation value of the co-extruded sheet or film is selected from the range of 100 nm or less, or 3000 nm or greater.

In the case where the retardation value is 100 nm or less, it is preferable to use a copolymeric polycarbonate resin produced by copolymerizing monomers each containing an aromatic ring directed perpendicular to the main chain (e.g., fluorene group-substituted bisphenol, styrene graft bisphenol A polycarbonate, etc.) so that the photoelasticity is decreased.

In the case of a normal aromatic polycarbonate resin (using 2,2-bis(4-hydroxyphenyl)propane), a film or sheet having a retardation value of 3000 nm or greater and 20000 nm or less, preferably 4000 nm or greater, especially preferably 5000 nm or greater, is selected. A high retardation value means a large stress (residual stress) due to molecular alignment. In general, a film or sheet of aromatic polycarbonate resin having a high retardation value also has a disadvantage of being inferior in the crack resistance to a film or sheet having a small residual stress.

A conventional sheet or film formed only of an aromatic polycarbonate resin having a high retardation value of 3000 nm or greater is produced by the following method. The aromatic polycarbonate resin of a temperature higher than the glass transition temperature is delaminated from the roll, and the resin is stretched and cooled, so that the amount of stretching is controlled.

A co-extruded sheet or film having an improved surface hardness used in the present invention and having a high retardation value is not industrially produced.

The above-described method used for the aromatic polycarbonate resin was applied to the co-extruded sheet or film having an improved surface hardness as it was. When the amount of stretching was increased, the film was disrupted and was not produced successfully.

By contrast, when the co-extruded sheet or film is stretched by a batch-system stretch machine while being heated, a sheet or film having a high retardation value can be produced. Based upon this, it is considered that the film is disrupted because the acrylic-based resin layer on the surface is cracked and thus is disrupted. Therefore, it is estimated that if, for example, the acrylic-based resin layer side of the co-extruded sheet or film in an area to be delaminated from the roll and stretched is kept at a temperature no more than the glass transition temperature of the aromatic polycarbonate resin and no less than the glass transition temperature of the acrylic-based resin and thus a defect (cracks, etc.) of the acrylic-based resin layer is prevented, a sheet or film having a large amount of stretching (having a high retardation value) can be produced. It is also estimated that when a flexible copolymer containing, for example, 10 mol % or higher of an acrylic-based resin having a large carbon number of ester group is used as a copolymerization component, a large amount of stretching can be achieved more easily although such a copolymer is inferior in terms of the improvement degree of the surface hardness or crack resistance when there is no defect.

An aromatic polycarbonate resin usable for the present invention is a polymer produced from a well-known method from, for example, a monomer such as a bisphenol compound represented by bishydroxy(halogeno)phenylalkane such as 2,2-bis(4-hydroxyphenyl)propane, 2,2-bis(4-hydroxy-3,5-dibutylphenyl)propane or the like, or a monomer in which the alkane part is substituted with a fluorene group or the like.

The molecular weight may be in a usual range, and is preferably 17,000 to 40,000 by the viscosity average molecular weight from the viewpoint of ease of shaping and mechanical strength, and is more preferably 20,000 to 30,000 from the viewpoint of ease of production by extrusion.

An acrylic-based resin usable for the present invention may be a single polymer of any of various (meth)acrylic acid esters represented by polymethylmethacrylate (PMMA) and polymethacrylate (PMA), a copolymer of methylmethacrylate (MMA) or methylacrylate (MA) and at least one other monomer, or a mixture of a plurality of such resins.

A hard acrylic-based resin usually having a hardness of 2H containing MMA or MA as a main component is preferably used for a surface layer for the purpose of resisting against abrasion. By contrast, a copolymer of alkyl(meth)acrylate having an alkyl group with carbon number of 2 or greater, more specifically, a soft acrylic-based resin usually containing 5 mol % or higher of preferably 10 mol % or higher of, such alkyl(meth)acrylate, is flexible and has a high adhesiveness although being inferior in terms of the improvement degree of the surface hardness or crack resistance. Therefore, such a copolymer is preferably used for an inner surface or a surface of a pre-treatment layer for coating such as hard-coating or the like.

Other monomers copolymerizable with MMA or MA include alkyl(meth)acrylate having a carbon number of alkyl group of 2 to 18; α,β-unsaturated acid such as acrylic acid, methacrylic acid or the like; bivalent carboxylic acid containing unsaturated group such as maleic acid, fumaric acid, itaconic acid or the like; alkylesters thereof; aromatic vinyl compounds such as styrene, α-methylstyrene, nucleus-substituted styrene and the like; vinyl cyanide compounds such as acrylonitrile, methacrylonitrile and the like; maleic acid anhydride, maleimide, N-substituted maleimide; and the like. Usable monomers further include mixtures of copolymers thereof and various derivatives thereof such as hydrogen-added substances and the like. Among these, aliphatic compounds are preferable. Alkyl(meth)acrylate having a carbon number of alkyl group of 2 to 18 is preferable. In addition, a substance obtained by adding hydrogen to a benzene ring of an acrylic-based resin obtained by copolymerization of styrene or the like is usable. Examples of such (meth)acrylic-based resins include Acrypet (trademark; produced by Mitsubishi Rayon Co., Ltd.), Delpet (trademark; produced by Asahi Kasei Chemicals Corporation), Parapet (trademark; produced by Kuraray Co., Ltd.), and the like.

[Adhesive Layer]

According to the present invention, an adhesive layer is used for bonding a protective layer and a functional layer, and in the case where a polarizing film layer and a photochromic film are used as functional layers, the adhesive layer is used for bonding the functional layers.

Usable adhesives include acrylic resin-based materials, urethane resin-based materials, polyester resin-based materials, melamine resin-based materials, epoxy resin-based materials, silicone resin-based materials, and the like. Specifically from the viewpoint of adhesiveness with aromatic polycarbonate, and adhesiveness with the polarizing layer or the photochromic layer, a two-liquid thermosetting urethane resin containing a polyurethane prepolymer, which is an urethane resin-based material, and a curing agent is preferable.

[Production of the Functional Sheet].

A functional sheet according to the present invention is produced by use of the above elements.

Usually, a co-extruded sheet or film including an aromatic polycarbonate resin layer and an acrylic-based resin layer used as protective layers of the present invention is available in the form of a lengthy roll and thus is used in this form. A polarizing functional layer is also available in the form of a lengthy roll and thus is used in this form. In the case where a photochromic film produced as a photochromic functional layer is used, such a photochromic film is available in the form of a lengthy roll and thus is used in this form. A sheet or film drawn out of each of the rolls is subjected to prescribed surface treatment as necessary, and then a solution of an adhesive according to the present invention is applied thereto. Each of the resultant sheets or films is dried to form an adhesive layer substantially with no solvent. These sheets or films are laminated and bonded together by pressurization. Then, the resultant sheet or film is taken into a roll, or cut into a prescribed size. The resultant sheet or film is stored so that the curing reaction proceeds. Thus, the functional sheet is produced.

In the case where the photochromic functional layer is formed of an adhesive composition, the functional layer is usually formed in substantially the same manner as described above except that a thick adhesive layer is formed.

First, in the case where only the photochromic functional layer is included, namely, a polarizing film is not used, the photochromic functional layer needs to be formed on a surface of the co-extruded sheet or film. Therefore, a substance which is not harmful for aromatic polycarbonate is selected as a component of a photochromic adhesive composition, or a layer providing a solvent resistance is used. As the layer providing a solvent resistance, the acrylic-based resin layer side of the co-extruded sheet or film including the above-mentioned soft acrylic resin layer is used, for example.

In the case where a polarizing film is used, the functional sheet is produced as follows. An adhesive composition layer is formed on one surface of the polarizing film, and the polarizing film is bonded to the co-extruded sheet or film. Then, a photochromic adhesive composition layer with no solvent is formed on the opposite surface of the polarizing film, and the aromatic polycarbonate of the co-extruded sheet or film is laminated on the photochromic adhesive composition layer. Alternatively, as described above, as the co-extruded sheet or film according to the present invention, a sheet or film including a flexible acrylic copolymer layer is used.

In the case where a polarizing film is used and a protective sheet or film having a high retardation value is adopted, great care is needed because such a sheet or film having a high retardation value tends to be inferior in the crack resistance to a sheet or film having a low retardation value. In the case where a sheet or film having a high retardation value is used, the stretching direction of the sheet or film and the stretching direction of the polarizing film are parallel to each other or perpendicular to each other.

[Production of the Lens]

The polarizing functional sheet, the photochromic functional sheet, or the polarizing and photochromic functional sheet produced above is used to form a lens. The functional sheet is subjected to external shape processing such that the acrylic-based resin layer is at the convexed surface, and then is subjected to bending processing while being heated and pressurized. Thus, a processed lens is produced. Alternatively, the functional film which has been subjected to external shape processing and bending processing in the same manner as described above is attached to a mold such that the convexed surface is in contact with the mold, and is provided with a transparent thermoplastic resin on the concaved surface by means of injection molding. Thus, a molded lens is produced.

In the case where the bent lens is used without injection molding, it is necessary that the lens itself has a strength. Both surfaces of the lens are surfaces of the lens as the final product. Therefore, a functional sheet including a thick protective layer and is structured such that both surfaces are of an acrylic-based resin is selected. The total thickness of the functional sheet including the two acrylic-based resin layers is 0.8 mm or greater, preferably 1 to 3 mm. In the case of a co-extruded sheet using usual aromatic polycarbonate, it is preferable that the retardation value is high.

In the case where the molded lens is produced by means of injection molding, a fused resin is provided on the surface of the functional sheet to which injection molding has been performed. Therefore, defects other than foreign objects, for example, defects like scratches or the like are erased. In consideration of this and also the adhesiveness with aromatic polycarbonate usually used for injection molding and optical properties, it is preferable that the surface of the functional sheet is of aromatic polycarbonate. The thickness of the protective layer on the side to which injection molding is performed merely needs to be sufficient to protect the functional layer.

The surface of the functional sheet in contact with the mold, which is usually the convexed surface, usually has various functional layers formed thereon after the molded lens is produced. For this reason, for the protective layer on this side, a substance which is suitable to such surface treatment steps is preferable. For example, a flexible acrylic copolymer layer is used as the protective layer on the side of the mold.

The total thickness of the functional sheet including the two protective layers is 0.3 mm or greater, preferably 0.4 to 0.9 mm.

According to the present invention, in the case where a functional sheet including a polarizing layer is selected and a co-extruded sheet using usual aromatic polycarbonate is selected as described above, it is preferable that the co-extruded sheet has a high retardation value.

A most general usual aromatic polycarbonate resin, namely, a polycarbonate resin containing 2,2-bis(4-hydroxyphenyl)propane as a main monomer has a large optical elasticity constant.

Therefore, when this polycarbonate resin having such a large optical elasticity constant is used, unless any special operation of keeping the retardation value low is used, stress caused by fixing the lens to the frame or a temperature change or stress caused by bending processing or the like remains. In a functional sheet including a polarizing layer, interference fringes are observed due to birefringence generated by the stress.

By contrast, when a co-extruded sheet having a sufficiently large retardation value is used, such stress does not cause new interference fringes. A reason for this is that with a co-extruded sheet having a sufficiently large retardation value, the change due to the value of stress birefringence is negligible, and therefore the direction thereof is not substantially changed.

Hereto, schematic cross-sectional views showing a co-extruded sheet used as a protective layer according to the present invention described above, schematic cross-sectional views showing a functional sheet, schematic cross-sectional views showing a bent lens and a molded lens each using the functional sheet, and a schematic cross-sectional view showing a functional sheet in the conventional art are attached.

FIG. 1 provides schematic cross-sectional views each showing a co-extruded sheet used as a protective layer according to the present invention. The thickness of each layer or the like is optionally changeable, but there are four layer structures shown here for the co-extruded sheet. Reference sign 2 refers to a hard acrylic-based resin layer, and is provided mainly for improving the surface hardness. Reference sign 3 refers to a soft acrylic-based resin layer, and is provided mainly for improving the solvent resistance and the inter-layer adhesiveness.

FIG. 2 provides schematic cross-sectional views each showing a functional sheet according to the present invention corresponding to each of the examples. FIG. 2a and FIG. 2b correspond to Examples 1 and 2, respectively. The functional sheet includes the hard acrylic-based resin layer 2 at both surfaces thereof. In FIG. 2b, the soft acrylic-based resin layers 3 are included on the inner side. FIGS. 2c, 2d and 2e correspond to Examples 3, 4 and 5, respectively. The functional sheet includes the aromatic polycarbonate resin layer 1 at one surface thereof. In FIG. 2d, the soft acrylic-based resin layers 3 are included at the inner side.

The functional sheet according to the present invention includes the hard or soft acrylic-based resin layer 2 or 3 at at least one surface thereof. The soft acrylic-based resin layer is superior in the abrasion resistance to the aromatic polycarbonate resin layer 1. The surface having the soft acrylic-based resin layers 3 has an improved adhesiveness. The aromatic polycarbonate resin layer 1 is provided on one surface in order to be integrated with the aromatic polycarbonate resin layer 7 provided by injection molding and thus is formed into a molded product with no interface.

FIG. 3 provides schematic cross-sectional views each showing a bent lens (Example 6) using the functional sheet according to the present invention corresponding to each of Examples 1 and 2. These lenses are obtained by bending processing performed on the functional sheets in FIGS. 2a and 2b. The lenses each have the hard acrylic-based resin layer 2 at both surfaces thereof and thus have an improved abrasion resistance.

FIG. 4 provides schematic cross-sectional views each showing a molded lens (Example 7) using the functional sheet according to the present invention corresponding to each of Examples 3, 4 and 5.

FIG. 5 is a schematic cross-sectional view showing a functional sheet in the conventional art.

The lenses produced above were used as they were, or were optionally provided with any of various functional layers such as a reflection-preventive layer, a hard-coating layer, a stain-preventive layer, an anti-fogging layer and the like. Alternatively, the lenses are provided with gradations or other designs by dyeing or the like, and are preferably used for sunglasses, goggles, corrective glasses or the like.

The functional sheet according to the present invention may be used for a polarizing plate, a photochromic plate, a polarizing/photochromic plate or the like as it is as a sheet having an improved abrasion resistance, or after being optionally provided with any of various functional layers such as a reflection-preventive layer, a hard-coating layer, a stain-preventive layer, an anti-fogging layer and the like.

EXAMPLES

Hereinafter, the present invention will be described by way of examples.

[Protective Layer]

Co-Extruded Sheet (10) (See FIG. 1a):

A PC/PMMA co-extruded sheet (PMMA: methylmethacrylate; produced by Mitsubishi Gas Chemical Company Inc.) was stretched while being heated at a temperature of 160° C. by a batch-system stretch machine to have a thickness of 0.7 mm (thickness of the PMMA layer: 100 µm) and a retardation value of about 5500 nm.

This sheet has an inclination structure occurring at an interface between PC and PMMA, and the interface has a relatively low light reflectance.

Co-Extruded Sheet (20) (See FIG. 1b):

A PMMA/PC/C-PMMA co-extruded sheet (C-PMMA: a copolymer of methylmethacrylate, methylacrylate and butylacrylate; produced by Mitsubishi Gas Chemical Company Inc.) was monoaxially stretched as described above to have a thickness of 0.7 mm and a retardation value of about 5500 nm (thickness of the PMMA layer: 100 µm; thickness of the C-PMMA layer: about 30 µm).

This sheet also has an inclination structure occurring at the interfaces as described above.

Co-Extruded Sheet (30) (See FIG. 1a):

A PC/PMMA two-layer co-extruded sheet having a thickness of 0.3 mm (thickness of the PMMA layer: 60 μm; produced by Mitsubishi Gas Chemical Company Inc.) was prepared. This sheet has an inclination structure occurring at the interface as described above.

Co-Extruded Sheet (40) (See FIG. 1a):

A PC/PMMA two-layer co-extruded sheet produced by Mitsubishi Gas Chemical Company Inc.) was monoaxially stretched as described above to have a thickness of 0.3 mm and a retardation value of about 5500 nm (PMMA: a copolymer of methylmethacrylate and methylacrylate; thickness: about 50 μm).

This sheet also has an inclination structure occurring at the interface as described above.

Co-Extruded Sheet (50) (See FIG. 1c):

A C-PMMA/PC/C-PMMA three-layer co-extruded sheet (produced by Mitsubishi Gas Chemical Company Inc.) was monoaxially stretched as described above to have a thickness of 0.3 mm and a retardation value of about 5500 nm (thickness of the C-PMMA layer: about 30 μm).

This sheet also has an inclination structure occurring at the interfaces as described above.

Co-Extruded Sheet (60) (See FIG. 1d):

A PC/C-PMMA co-extruded sheet (produced by Mitsubishi Gas Chemical Company Inc.) was monoaxially stretched as described above to have a thickness of 0.3 mm and a retardation value of about 5500 nm (thickness of the C-PMMA layer: about 30 μm).

This sheet also has an inclination structure occurring at the interface as described above.

Separately from the above, a usual sheet of bisphenol A polycarbonate (PC) having a thickness of 0.3 mm, and PC sheets having a thickness of 0.3 mm and 0.7 mm and having a retardation value of about 5500 nm were prepared.

[Polarizing Film (Polarizing Layer)]

A PVA film (trade name: VF-PS#7500 produced by Kuraray Co., Ltd.) was immersed in water of 35° C. to remove glycerin from the film. Next, the resultant film was immersed in an aqueous solution of 35° C. containing 35 g/L of Sumilight Red 4B-P (C.I. 28160), 0.18 g/L of Chrysophenine (C.I. 24895), 1.33 g/L of Sumilight Supra Blue G (C.I. 34200), and 5 g/L of anhydrous sodium sulfate for 3 minutes. During and after this dyeing process, the film was monoaxially stretched to be four times larger. The resultant dyed film was immersed in an aqueous solution of 35° C. containing 2.5 g/L of nickel acetate and 6.0 g/L of boric acid for 3 minutes. The resultant film was dried at room temperature for 3 minutes in the state where the tensile state was maintained, and then heated at 110° C. for 3 minutes. Thus, a polarizing film was obtained.

[Photochromic Adhesive Solution]

To 100 g of polyurethane prepolymer, 20 g of curing agent was added. To the resultant substance, 0.82 g (1% with respect to the total amount after volatization of the solvent and curing) of 4-[4-[6-(4-morphonyl)-3-phenyl-3H-naphtho(2,1-b)pyran-3-yl]phenyl]-morphine (trade name: Reversacol Flame, produced by James Robinson, Ltd.) was added as a photochromic compound, and stirred at room temperature for 1 hour. Thus, a photochromic adhesive solution was prepared.

[Adhesive Composition]

To 50 parts by weight of polyurethane prepolymer, 5 parts by weight of curing agent and 60 parts by weight of ethyl acetate as a solvent were added. Thus, an adhesive composition was prepared.

Example 1 (See FIG. 2a)

To one surface of the polarizing film obtained above, the adhesive composition was applied by use of a coater and dried at 110° C. for 5 minutes. The two-layer co-extruded sheet (10) having a thickness of 0.7 mm was laminated thereon such that the PC layer would be in contact with the adhesive composition. Next, on the surface of the polarizing film of the resultant laminate, an adhesive layer was formed in the same manner. Then, another co-extruded sheet (10) was laminated such that the PC layer would be in contact with the adhesive layer. The resultant laminate was dried at room temperature for 1 day or longer and then at 70° C. for 1 day. Thus, a polarizing sheet of PMMA*PC/adhesive layer/polarizing film/adhesive layer/PC*PMMA having a thickness of 1.5 mm was obtained. Both of the surfaces of the polarizing film were of PMMA.

The resultant polarizing sheet was subjected to a pencil hardness test (JIS-K-5600-5-4). The polarizing sheet was confirmed to have a pencil hardness of 3H.

Comparative Example 1 (See FIG. 5)

A polarizing sheet of PC/adhesive layer/polarizing film/adhesive layer/PC was obtained in the same manner as in Example 1 except that the above-described polycarbonate sheet having a high retardation (produced by Mitsubishi Gas Chemical Company Inc.) was used instead of the co-extruded sheet (10) used in Example 1.

The resultant polarizing sheet was subjected to a pencil hardness test in the same manner as in Example 1. The polarizing sheet had a pencil hardness of B.

Example 2 (See FIG. 2b)

To the C-PMMA-side surface of the three-layer co-extruded sheet 20 having a thickness of 0.7 mm, the above-described adhesive composition was applied by use of a coater and dried at 110° C. for 5 minutes. Then, the above-obtained polarizing film was laminated thereon by use of a laminator. Separately, on the co-extruded sheet (20), the adhesive composition was applied thereto and dried in the same manner as described above. On the surface of the polarizing film of the above-obtained laminate, the separately obtained sheet was laminated such that the C-PMMA-side surface thereof would be in contact with polarizing film. Next, the resultant laminate was dried at room temperature for 1 day or longer and then at 70° C. for 1 day. Thus, a polarizing sheet of PMMA*PC*C-PMMA/adhesive layer/polarizing film/adhesivelayer/C-PMMA*PC*PMMA having a thickness of 1.5 mm was obtained. Both of the surfaces of the polarizing sheet were of PMMA.

The resultant polarizing sheet was subjected to a pencil hardness test in the same manner as in Example 1. The polarizing sheet was confirmed to have a pencil hardness of 3H.

In the case where the adhesive composition is applied to the PC-side surface and dried, minute cracks are often observed. In this example, no minute crack was observed.

Example 3 (See FIG. 2c)

A polarizing sheet of PMMA*PC/adhesive layer/polarizing film/adhesive layer/PC having a thickness of 0.6 mm was obtained in the same manner as in Example 1 except that the co-extruded sheet (40) (2) having a thickness of 0.3 mm was used as one protective sheet and a high retardation PC film having a thickness of 0.3 mm was used as the other protective sheet, instead of the co-extruded sheet (10) used in Example 1.

The resultant polarizing sheet was subjected to a pencil hardness test in the same manner as in Example 1. The polarizing sheet had a pencil hardness of 3H on the PMMA side and a pencil hardness of B on the PC side.

Example 4 (See FIG. 2d)

To the C-PMMA-side surface of the three-layer co-extruded sheet (50) having a thickness of 0.3 mm, the above-described adhesive composition was applied by use of a coater and dried at 110° C. for 5 minutes. Then, the above-obtained polarizing film was laminated thereon by use of a laminator. Separately, on the C-PMMA-side surface of the two-layer co-extruded sheet (60) having a thickness of 0.3 mm, the adhesive composition was applied thereto and dried in the same manner as described above. On the surface of the polarizing film of the above-obtained laminate, the separately obtained sheet was laminated such that the C-PMMA-side surface thereof would be in contact with polarizing film. Next, the resultant laminate was dried at room temperature for 1 day or longer and then at 70° C. for 1 day. Thus, a polarizing sheet of C-PMMA*PC*C-PMMA/adhesive layer/polarizing film/adhesive layer/C-PMMA*PC* having a thickness of 0.6 mm was obtained.

The resultant polarizing sheet was subjected to a pencil hardness test in the same manner as in Example 1. The resultant polarizing sheet had a pencil hardness of H on the C-PMMA side and a pencil hardness of B on the PC side.

In the case where the adhesive composition is applied to the PC-side surface and dried, minute cracks are often observed. In this example, no minute crack was observed, like in Example 2.

Example 5 (See FIG. 2e)

The above-obtained photochromic adhesive solution was applied to the co-extruded sheet (30) by use of a coater and dried at 70° C. for 10 minutes. Then, on the resultant sheet, a usual PC film was laminated by use of a laminator. Next, the resultant laminate was dried at room temperature for 1 day or longer and then at 70° C. for 1 day to be cured. Thus, a photochromic sheet of PMMA*PC/photochromic layer/PC was obtained.

The resultant photochromic sheet was subjected to a pencil hardness test in the same manner as in Example 1. The photochromic sheet had a pencil hardness of 3H on the PMMA side and a pencil hardness of B on the PC side.

Example 6 (See FIG. 3)

The polarizing sheets of Examples 1 and 2 each having a thickness of 1.5 mm were punched into a rectangular capsule shape having a length of 80 mm in the stretching direction and a width of 55 mm in a direction perpendicular thereto, with the four corners thereof being cut away.

Each of these capsule-shaped pieces was subjected to bending processing as follows. A concaved spherical bending mold (radius of curvature: 66.81 mm; base curve: 7.932) coated with a silicone rubber sheet and having a function of vacuum absorption was used. Each capsule-shaped piece was placed on a female silicone rubber sheet which was set to a surface temperature of 145° C., and vacuum absorption was started. Next, the capsule-shaped piece was pressurized with a male spherical bent mold coated with a silicone rubber sheet. Thus, the capsule-shaped piece was formed into a spherical shape. Herein, the "base curve" is a curvature of a front surface of the lens, and is a value obtained by dividing 530 by the radius of curvature in units of millimeters.

The steps of punching and bending the sheet into a desired shape were conducted successfully, and lenses having a surface which is not liable to be scratched were obtained.

Example 7 (See FIG. 4)

The polarizing sheets of Examples 3 and 4 each having a thickness of 0.6 mm and the photochromic sheet of Example 5 having a thickness of 0.6 mm were each punched into a true circular shape having a diameter of 79.5 mm and cut to have a width in a direction perpendicular to the stretching direction of 55 mm.

Next, each of these pieces was subjected to bending processing so as to have a shape matching a spherical surface (radius of curvature: 66.81 mm; base curve: 7.932) of a mold used for injection molding. The bending processing was performed by use of a mold having the same surface shape as that of the mold used for injection molding, in the state where the PMMA- or C-PMMA-side was on the convexed surface side.

The bent pieces were each inserted into the mold to be used for the injection molding, and was provided with an aromatic polycarbonate resin on the concaved surface side by injection molding performed at 300° C. Thus, aromatic polycarbonate polarizing and photochromic lenses were produced.

The resultant molded lenses are usually used after being, for example, hard-coated.

Even without being hard-coated, the convexed surface of these lenses is not liable to be scratched. Therefore, these lenses are easy to be handled, and are also improved in the post-hard-coating abrasion resistance.

INDUSTRIAL APPLICABILITY

A functional sheet and a lens using the same according to the present invention provide a stable inter-layer adhesive strength and a superb abrasion resistance, and are highly applicable to post-processing such as hard-coating, and thus are preferably usable for sunglasses, goggles, corrective glasses or the like.

REFERENCE SIGNS LIST

1 Aromatic polycarbonate resin layer
2 Hard acrylic-based resin layer
3 Soft acrylic-based resin layer
4 Adhesive layer
5 Polarizing film layer
6 Photochromic film layer
7 Aromatic polycarbonate resin layer obtained as a result of injection molding
10 Co-extruded sheet
20 Co-extruded sheet
30 Co-extruded sheet
40 Co-extruded sheet
50 Co-extruded sheet
60 Co-extruded sheet

What is claimed is:

1. A method of producing a functional sheet, comprising:
    forming the functional sheet with at least one of a polarizing functional layer and a photochromic functional layer and protective layers on both surfaces of the at least one of a polarizing functional layer and a photochromic functional layer, the protective layers comprising an aromatic polycarbonate resin sheet or film;

forming at least one of the protective layers from a co-extruded sheet or film comprising an aromatic polycarbonate resin layer and an acrylic-based resin layer on one surface or both surfaces of the aromatic polycarbonate resin layer by stretching the aromatic polycarbonate resin layer and the acrylic-based resin layer at a temperature no more than the glass transition temperature of the aromatic polycarbonate resin and no less than the glass transition temperature of the acrylic-based resin;

at least one surface of the functional sheet comprises the acrylic-based resin layer, wherein the acrylic-based resin layer of the co-extruded sheet or film is a hard acrylic-based resin layer which exhibits a pencil hardness of 2H or higher at a thickness of 60 μm according to a pencil hardness test of JIS-K-5600-5-4, and wherein the co-extruded sheet or film has a retardation of 3000 nm or greater.

2. A method for producing a molded lens comprising:

producing a functional sheet, comprising forming the functional sheet with at least one of a polarizing functional layer and a photochromic functional layer and protective layers on both surfaces of the at least one of a polarizing functional layer and a photochromic functional layer, the protective layers comprising an aromatic polycarbonate resin sheet or film;

forming at least one of the protective layers from a co-extruded sheet or film comprising an aromatic polycarbonate resin layer and an acrylic-based resin layer on one surface or both surfaces of the aromatic polycarbonate resin layer by stretching the aromatic polycarbonate resin layer and the acrylic-based resin layer at a temperature no more than the glass transition temperature of the aromatic polycarbonate resin and no less than the glass transition temperature of the acrylic-based resin;

external shape processing the functional sheet such that the acrylic-based resin layer is on a convex surface side, the external shape processing comprising bending the acrylic-based resin layer while heating and pressurizing the acrylic-based resin layer; then attaching the functional sheet to a mold such that the convex surface side is in contact with the mold; and providing an aromatic polycarbonate resin on a concave surface side of functional sheet by injection molding, the acrylic-based resin layer of the co-extruded sheet or film exhibits a pencil hardness of 2H or higher at a thickness of 60 μm according to a pencil hardness test of JIS-K-5600-5-4, and wherein the co-extruded sheet or film has a retardation of 3000 nm or greater.

3. The method according to claim 2, comprising producing the polarizing functional layer by dyeing a poly(vinyl alcohol)-based resin film with a dichroic organic dye and stretching the poly(vinyl alcohol)-based resin film.

4. The method according to claim 2, comprising producing the photochromic functional layer by a casting method of a non-aromatic-based polymer solution comprising a photochromic organic compound.

5. The method according to claim 2, comprising producing the photochromic functional layer by heating to cure a two-liquid thermosetting urethane resin comprising a polyurethane prepolymer which comprises a photochromic organic compound and a curing agent.

6. The method according to claim 5, wherein the photochromic functional layer is adhered to the protective layer or adhered to the polarizing functional layer.

7. The method according to claim 2, wherein the co-extruded sheet or film has a retardation of 5000 nm or greater, and the co-extruded sheet or film is stretched.

8. Sunglasses or goggles comprising the molded lens obtained by the method according to claim 2.

9. The method according to claim 2, wherein the functional sheet includes one surface comprising the acrylic-based resin layer and another surface comprising the aromatic polycarbonate resin layer.

10. The method according to claim 1, wherein the co-extruded sheet or film has a retardation of 5000 nm or greater, and the co-extruded sheet or film is stretched.

* * * * *